(12) United States Patent
Hayakawa (10) Patent No.: US 12,481,205 B2
(45) Date of Patent: Nov. 25, 2025

(54) OPTICAL APPARATUS AND IMAGE PICKUP APPARATUS

(71) Applicant: CANON KABUSHIKI KAISHA, Tokyo (JP)

(72) Inventor: Makoto Hayakawa, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 328 days.

(21) Appl. No.: 18/358,397

(22) Filed: Jul. 25, 2023

(65) Prior Publication Data
US 2024/0036439 A1      Feb. 1, 2024

(30) Foreign Application Priority Data
Jul. 28, 2022  (JP) .................. 2022-120342

(51) Int. Cl.
*G03B 17/12*       (2021.01)
(52) U.S. Cl.
CPC .................... *G03B 17/12* (2013.01)
(58) Field of Classification Search
CPC ...................................... G03B 17/12
See application file for complete search history.

(56) References Cited

U.S. PATENT DOCUMENTS

| | | | |
|---|---|---|---|
| 8,564,891 B2 | 10/2013 | Kasumi et al. | |
| 2011/0261448 A1* | 10/2011 | Kasumi .................. | G02B 7/023 |
| | | | 359/399 |
| 2024/0027874 A1* | 1/2024 | Won ...................... | H04N 23/687 |

FOREIGN PATENT DOCUMENTS

| | | |
|---|---|---|
| JP | 2011227349 A | 11/2011 |
| JP | 2013174793 A | 9/2013 |
| JP | 2016109804 A | 6/2016 |

\* cited by examiner

*Primary Examiner* — James A Dudek
(74) *Attorney, Agent, or Firm* — ROSSI, KIMMS & McDOWELL LLP (57) ABSTRACT

An optical apparatus including: an optical element; a holding barrel that holds the optical element; a biasing barrel that holds the optical element between the holding barrel and the biasing barrel; and an elastic member that biases the biasing barrel toward the holding barrel, in which the holding barrel includes a first and second receivers for positioning the optical element in an optical axis direction and in an optical axis orthogonal direction, respectively, in which the elastic member biases the biasing barrel to cause the optical element being pressed against the first and second receivers, and being held with respect to the holding barrel in the optical axis and orthogonal directions, and in which the optical apparatus includes a movement amount limiting portion that limits a relative movement amount between the biasing and holding barrels in the optical axis and orthogonal directions.

13 Claims, 5 Drawing Sheets

OPTICAL APPARATUS AND IMAGE PICKUP APPARATUS

BACKGROUND OF THE INVENTION

Field of the Invention

The present disclosure relates to an optical apparatus and an image pickup apparatus.

Description of the Related Art

In lens barrels such as interchangeable lenses, thermal caulking or an adhesive is used to fix a lens to the lens barrel. In this case, a surface accuracy of the lens may change (lens surface distortion) due to a stress caused by fixing the lens to the lens barrel, and the optical performance of the lens may deteriorate.

Japanese Patent Application Laid-Open No. 2016-109804 discloses a technique in which a lens is pressed toward a holding concave portion of a lens holder by a pressing member that can be snap-fit to the lens holder, whereby the lens is biased and fixed to the lens holder. In a pressing portion of the pressing member, an elastic material such as foam or rubber is arranged in a ring shape, and the lens is pressed against the lens holder via an elastic material. Thus, a technique of fixing a lens to a lens holder while suppressing lens surface distortion is disclosed.

In order to suppress distortion of a lens surface caused by a stress for fixing the lens when fixing the lens to the lens barrel, it is necessary to fix the lens with a weak force. Specifically, when a lens mass is about 10 g, if the lens is pressed and fixed by a force of about 500 mN, the stress acting on the lens against the rigidity of the lens is small, and the distortion of the lens surface can be suppressed to be small.

However, when the lens is fixed via an elastic member provided in a narrow slit between the lens and the pressing member, a spring constant of the elastic member becomes extremely large, and the pressing force becomes large. Further, it is not easy to fix each individual member with the same force without variation.

Japanese Patent Application Laid-Open No. 2016-109804 does not disclose fixing of a lens in a direction orthogonal to an optical axis. When a lens is press-fitted and fixed to the lens barrel, strain of the lens surface deteriorates due to the stress. Further, if there is play between the lens barrel holding the lens and the lens in a direction orthogonal to the optical axis, there is a possibility that the lens moves and the lens position accuracy deteriorates, which causes a deterioration of the optical performance of the lens.

SUMMARY OF THE INVENTION

Accordingly, the present disclosure is to provide an optical apparatus capable of positioning an optical element with high accuracy while reducing optical element surface distortion with a simple configuration.

According to an aspect of the present disclosure, there is provided an optical apparatus including: an optical element; a holding barrel that holds the optical element; a biasing barrel that holds the optical element between the holding barrel and the biasing barrel; and an elastic member that biases the biasing barrel toward the holding barrel, in which the holding barrel includes an optical axis direction receiving portion for positioning the optical element in an optical axis direction, and an orthogonal direction receiving portion for positioning the optical element in an orthogonal direction to an optical axis, in which the elastic member biases the biasing barrel to cause the optical element being pressed against the optical axis direction receiving portion and the orthogonal direction receiving portion, and being held with respect to the holding barrel in the optical axis direction and the orthogonal direction, and in which the optical apparatus includes a movement amount limiting portion that limits a relative movement amount between the biasing barrel and the holding barrel in the optical axis direction and the orthogonal direction.

Further features of the present invention will become apparent from the following description of exemplary embodiments with reference to the attached drawings.

DESCRIPTION OF THE EMBODIMENTS

Preferred embodiments of the present disclosure will now be described in detail with reference to the accompanying drawings.

Embodiment 1

Figure 1:
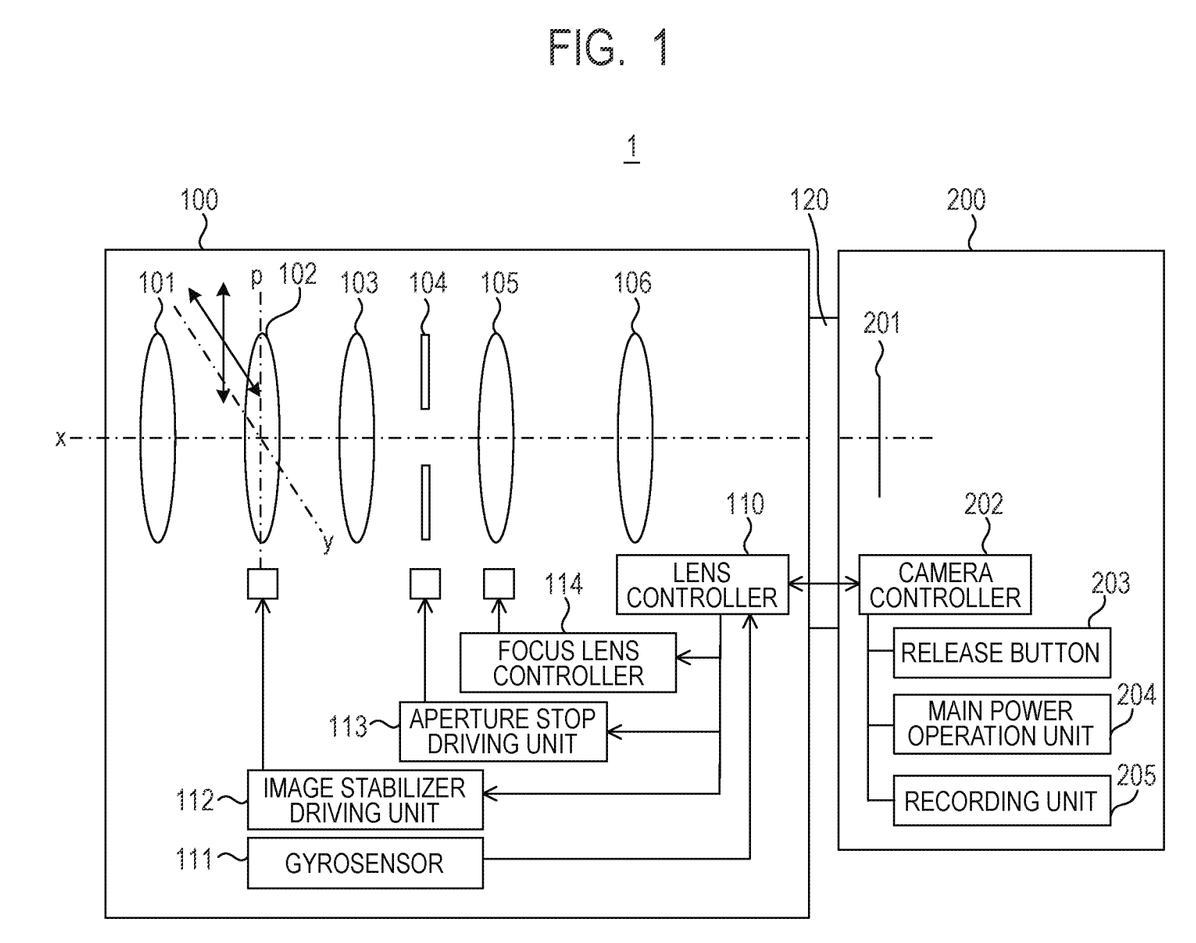
FIG. 1 is a schematic view showing a configuration of an image pickup apparatus including a lens barrel according to the present disclosure.

Referring to FIG. 1, a system configuration of an image pickup apparatus 1 including a lens apparatus 100 and a camera apparatus 200 of the present disclosure will be described.

The lens apparatus 100 includes in an order from an object side (left side in FIG. 1) to an image side (right side in FIG. 1): a first lens unit 101; a second lens unit 102; a third lens unit 103; an aperture stop unit 104; a fourth lens unit 105; and a fifth lens unit 106. The second lens unit 102 is supported by a lens barrel having a mechanism capable of moving in a direction having a component perpendicular to the optical axis, and constitutes an image stabilization unit driven in a plane perpendicular to the optical axis for image blur correction. The fourth lens unit 105 is a focus lens unit which is supported by a lens barrel movable in the optical axis direction and performs focus adjustment by moving in the optical axis direction. The first lens unit 101, the third lens unit 103, and the fifth lens unit 106 are held by a lens barrel which does not move in the optical axis direction.

Each of the first lens unit 101, the second lens unit 102, the third lens unit 103, the fourth lens unit 105, and the fifth lens unit 106 includes one or more lenses. In an optical operation such as zooming, focus adjustment, and image blur correction, the positional relationship of the lenses in each lens unit does not change.

Further, the lens apparatus 100 includes a gyro sensor 111 serving as a detection unit that detects vibration of the lens apparatus 100, and a lens controller 110 that controls driving of a movable lens unit and an aperture stop.

The lens controller 110 controls the aperture stop driving unit 113 and the focus lens driving unit 114 to drive the aperture stop unit 104 and the fourth lens unit 105, thereby changing the aperture diameter and adjusting the focus.

The lens controller 110 calculates an image blur correction amount based on a detection value of the gyro sensor 111, and controls the image stabilization driving unit 112 to perform image blur correction. The image stabilization is performed by driving the second lens unit 102 in they direction (yaw direction) and the p direction (pitch direction) orthogonal to each other in a plane orthogonal to the optical axis direction (x direction in the drawing).

The lens controller 110 also has a function of determining a holding state (change in posture) of the lens apparatus 100 or the camera apparatus 200 based on a detection value of the gyro sensor 111.

The lens apparatus 100 is detachably connected to the camera apparatus 200 via a mount 120. The camera apparatus 200 includes an image pickup element 201 and takes an image of a subject formed by an optical system in the lens apparatus 100. The camera apparatus 200 includes a camera controller 202, a release button 203 as an operation member, a main power operation unit 204, and a recording unit 205. The release button 203 has a two-stage push configuration, and can perform a first release operation of the first stage in which a push-in depth is shallower and a second release operation of the second stage in which the release button 203 is pressed deeper. When the first release operation is performed, the camera controller 202 performs photographing start preparations such as recovery from photographing standby status, start of image stabilization, start of auto focus, and start of photometry while cooperating with the lens controller 110 as necessary. When the second release operation is performed, the camera controller 202 performs picking up an image and records the image in the recording unit 205.

Further, power is transmitted and received between the camera apparatus 200 and the lens apparatus 100 via a contact block (not shown) provided in the mount 120, and image pickup information is communicated between the camera controller 202 and the lens controller 110.

A lens barrel according to a first embodiment of the present disclosure will be described with reference to FIGS. 2 to 5.

FIGS. 2 to 5 are diagrams showing a fifth lens barrel 300 that holds a fifth lens unit 106 as a lens barrel according to the first embodiment of the present disclosure.

Figure 2:
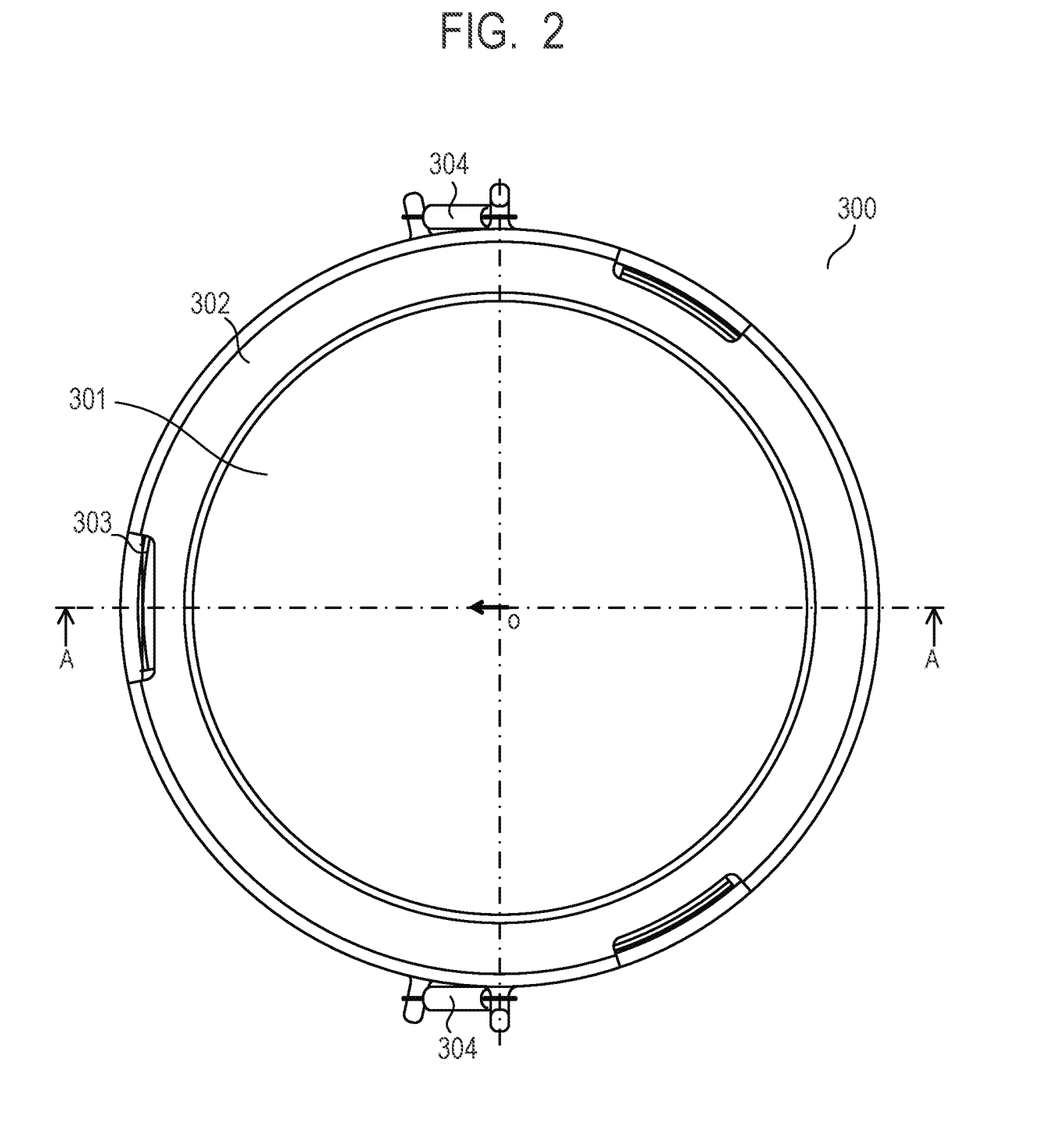
FIG. 2 is a diagram showing a configuration of the lens barrel of the present disclosure.
Figure 3:
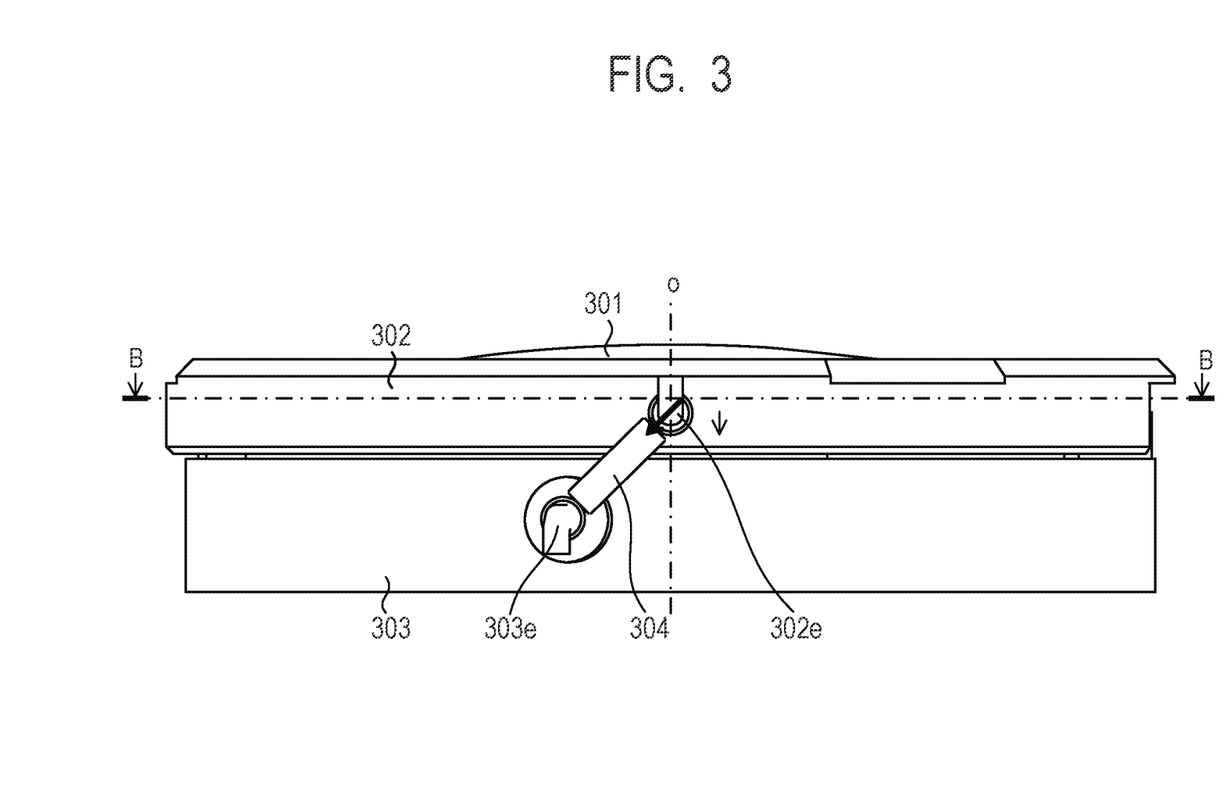
FIG. 3 is a diagram showing a configuration of the lens barrel of the present disclosure.
Figure 4:
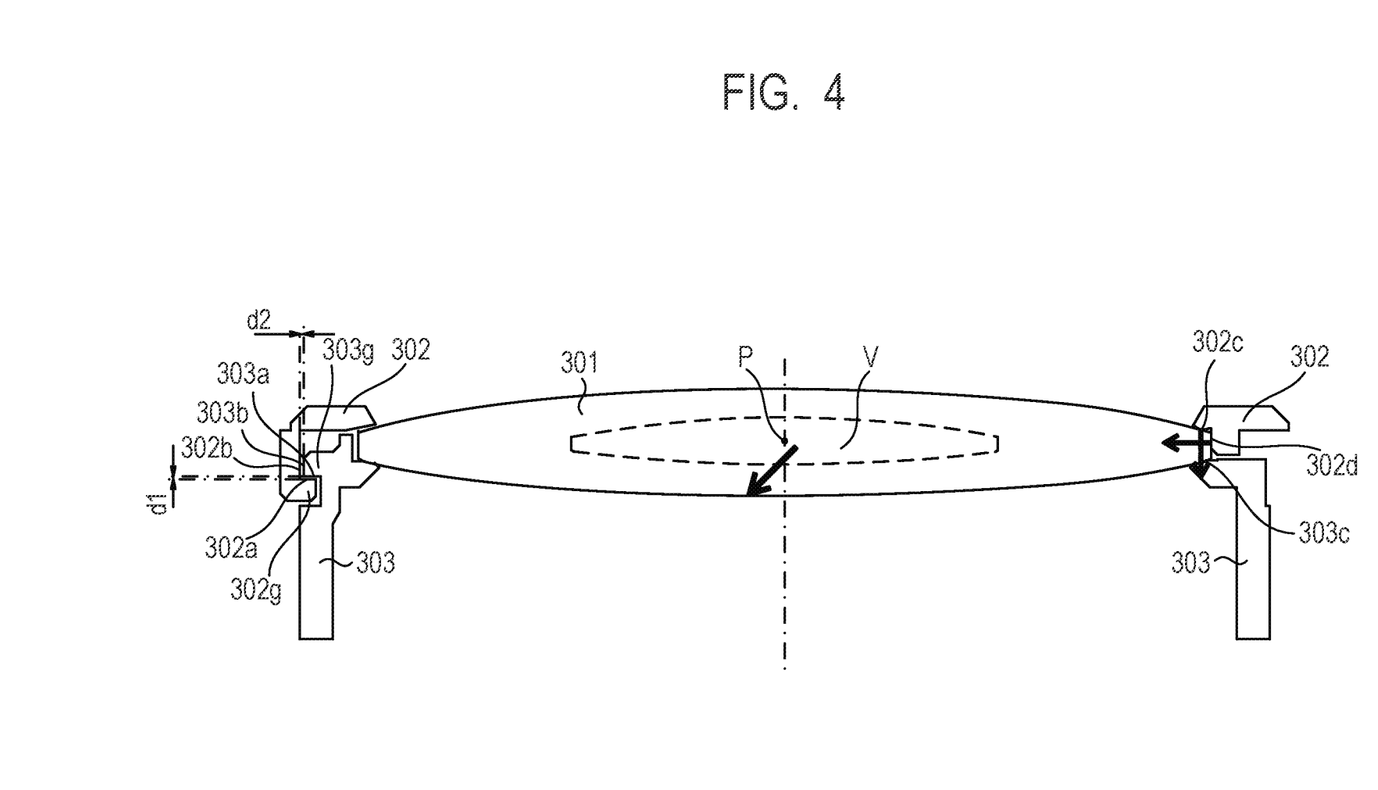
FIG. 4 is a cross-sectional view taken along a line A-A of FIG. 2.
Figure 5:
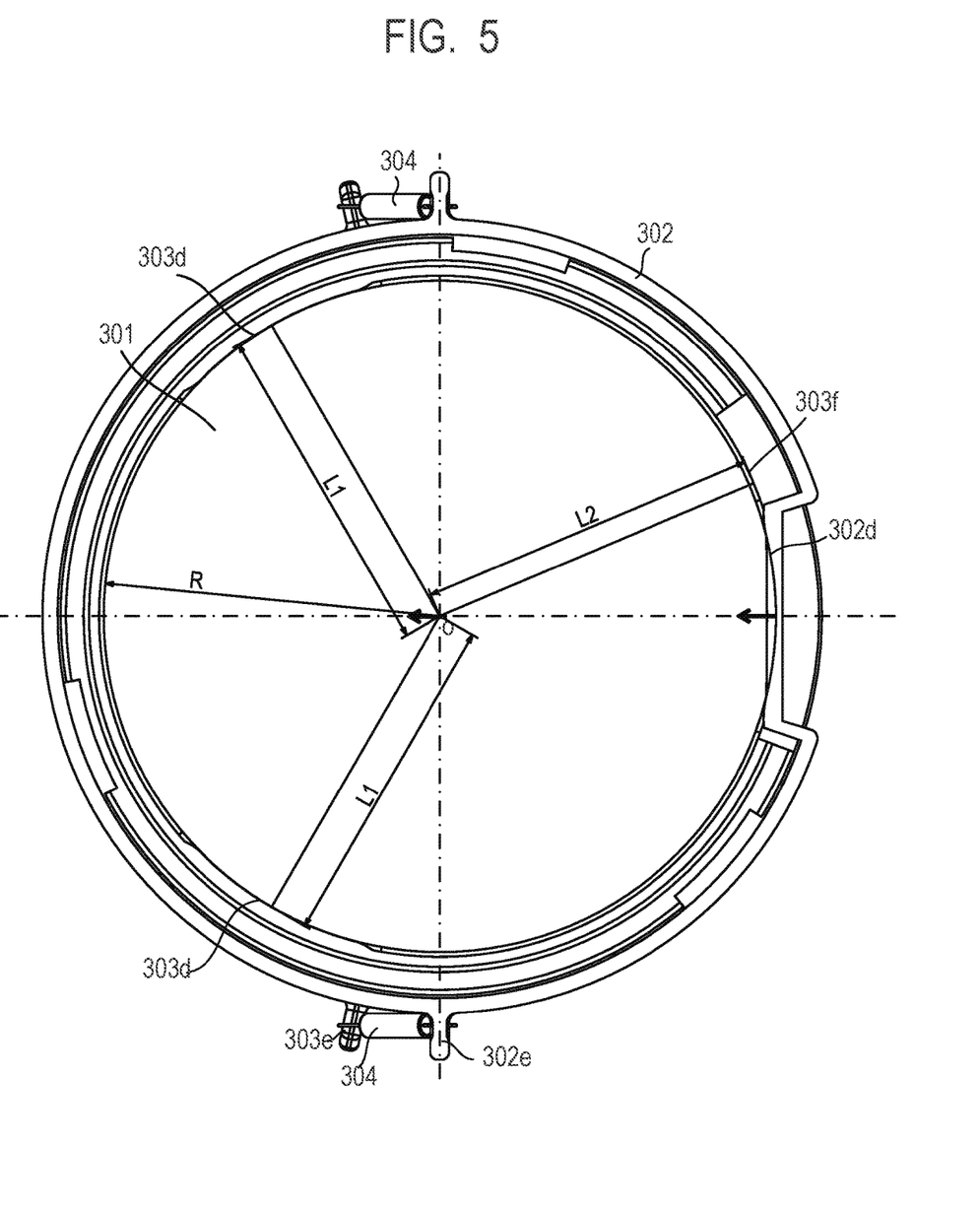
FIG. 5 is a cross-sectional view taken along a line B-B of FIG. 3.

FIG. 2 is a view of the fifth lens barrel 300 viewed from the object side in the optical axis direction. FIG. 3 is a side view of the fifth lens barrel 300 as viewed from the lower side of FIG. 2. FIG. 4 is a cross-sectional view taken along the line A-A of FIG. 2. FIG. 5 is a cross-sectional view taken along the line B-B of FIG. 3.

The fifth lens barrel 300 holds the lens 301 (optical element) constituting the fifth lens unit 106, and includes a biasing barrel 302, a holding barrel 303 (holding barrel), and an elastic member 304. The elastic member 304 is composed of two tension coil springs in this embodiment, but the present disclosure is not limited thereto, and the elastic member 304 may be composed of a compression coil spring, a leaf spring, rubber, or the like. The elastic member 304 has a first hook portion provided at one end of the elastic member 304 and engaged with the elastic member fixing portion 302e of the biasing barrel 302, and a second hook portion provided at the other end of the elastic member 304 and engaged with the elastic member fixing portion 303e of the holding barrel 303. The two elastic members 304 are disposed at positions substantially opposed to each other with the optical axis O interposed therebetween.

The two tension coil springs of the elastic member 304 are arranged at an angle of approximately 45 degrees with respect to a plane orthogonal to the optical axis With this arrangement, the combined force of the tensile forces of the two tension coil springs also acts in a direction inclined by approximately 45 degrees with respect to the plane orthogonal to the optical axis O. Here, the term "approximately 45 degrees with respect to the plane orthogonal to the optical axis" means 30 degrees or more and 60 degrees or less, preferably 40 degrees or more and 50 degrees or less, more preferably 42 degrees or more and 48 degrees or less, with respect to the plane orthogonal to the optical axis.

The two tension coil springs of the elastic member 304 are arranged such that their extension directions are substantially parallel to each other. The two tension coil springs of the elastic member 304 are preferably arranged to be substantially parallel to each other because the respective elastic forces effectively act for biasing the lens 301 as a resultant force. Here, the fact that the extension directions of the two tension coil springs are substantially parallel to each other means an arrangement in which an angle formed by one extension direction and the other extension direction is 10 degrees or less, preferably 5 degrees or less, and more preferably 3 degrees or less.

As shown in FIG. 3, the biasing barrel 302 is biased by the elastic member 304 toward the holding barrel 303 obliquely downward to the left in a plane of the drawing (in a direction inclined by approximately 45 degrees with respect to a plane orthogonal to the optical axis). The lens 301 is interposed between the holding barrel 303 and the biasing barrel 302 in the plane orthogonal to the optical axis direction and the optical axis.

The holding barrel 303 includes three optical axis direction receiving portions 303c which receive the lens 301 in the optical axis direction at substantially equal intervals of 120 degrees in a circumferential direction around the optical axis. The biasing barrel 302 has three optical axis direction biasing portions 302c at substantially equal intervals of 120 degrees in the circumferential direction around the optical axis. The lens 301 is pressed against the optical axis direction receiving portion 303c by the optical axis direction biasing portion 302c of the biasing barrel 302 which receives the elastic force of the elastic member 304, and is positioned in the optical axis direction. The optical axis direction receiving portion 303c may be formed at three or more positions, or may be formed around the entire circumference.

The optical axis direction biasing portion 302c may be formed at three or more positions, or may be formed around the entire circumference.

As described above, the resultant force of the biasing force applied to the biasing barrel 302 by the two tension coil springs, which are the elastic members 304, acts near the optical axis. Therefore, the biasing barrel 302 can bias the vicinity of the center of gravity of the lens 301 with respect to the holding barrel 303 in the optical axis direction. As a result, the deterioration of the optical performance of the entire lens apparatus due to a tilt of an axis of the lens 301 with respect to the optical axis of the optical system of the lens apparatus 100 can be avoided which may be caused by a resultant force of the biasing force acting on the lens 301 at a position apart from the center of gravity to bias the lens 301.

The holding barrel 303 has two optical axis orthogonal direction receiving portions 303d for positioning the lens 301 in a plane orthogonal to the optical axis. The biasing barrel 302 is biased to the left side of FIG. 3 by a biasing force having a component in a plane orthogonal to the optical axis by two tension coil springs. The optical axis orthogonal direction receiving portions 303*d* arranged at two positions of the holding barrel 303 are arranged on a side opposite to the side where the two elastic member fixing portions 302*e* of the biasing barrel 302 are disposed with respect to a first plane parallel to the optical axis passing through the two elastic member fixing portions 303*e*. Further, the optical axis orthogonal direction receiving portions 303*d* disposed at two positions are disposed at positions symmetrically with respect to a second plane which is orthogonal to a first plane and includes the optical axis, and are disposed at positions spaced apart from each other by approximately 120 degrees around the optical axis.

Further, in the present embodiment, the optical axis orthogonal direction receiving portion 303*d* is configured to have a circular arc shape having a radius L1 centered on a position of the optical axis in a plane orthogonal to the optical axis. However, the optical axis orthogonal direction receiving portion 303*d* is not limited to the circular arc shape in a plane orthogonal to the optical axis, and may be a D-cut shape, for example. In this case, the optical axis orthogonal direction receiving portion 303*d* is configured such that the distance between the D-cut shaped surface and the optical axis is L1.

The holding barrel 303 is provided with a guide portion 303*f* on an opposite side of the optical axis orthogonal direction receiving portion 303*d* with respect to the first plane. The guide portion 303*f* is provided for temporarily assembling the lens 301 and the holding barrel 303 before the biasing barrel 302 is assembled to the holding barrel 303 to position the lens 301 and the holding barrel 303 in a rough manner. The guide portion 303*f* is formed in a circular arc shape having a radius L2 around the optical axis position. A portion of the holding barrel 303 having a phase corresponding to a position of the optical axis orthogonal direction biasing portion 302*d* of the biasing barrel 302 described later is cut out so that the optical axis orthogonal direction biasing portion 302*d* can contact and bias the outer diameter portion of the lens 301.

The biasing barrel 302 has an optical axis orthogonal direction biasing portion 302*d* which biases the lens 301 toward the optical axis orthogonal direction receiving portion 303*d* (left direction in FIG. 5) by the biasing force of the elastic member 304 on the opposite side of the optical axis orthogonal direction receiving portion 303*d* with respect to the first plane. Thereby, the lens 301 is positioned with respect to the holding barrel 303 in a plane orthogonal to the optical axis.

Here, a radius L1 centered on the optical axis of the optical axis orthogonal direction receiving portion 303*d*, a radius L2 centered on the optical axis of the guide portion 303*f*, and a radius R of the outer diameter of the lens 301 satisfy a relationship represented by the following equations.

$$L1=R \quad (1)$$

$$R<L2 \quad (2)$$

That is, the guide portion 303*f* is configured to have a play between the holding barrel 303 and the lens 301 in at least one direction in a plane perpendicular to the optical axis when the lens 301 is in contact with the optical axis direction receiving portion 303*c* and the optical axis orthogonal direction receiving portion 303*d*.

First, by configuring the holding barrel 303 so as to satisfy the expression (1), since the lens 301 is positioned in a state of being biased to the optical axis orthogonal direction receiving portion 303*d* of the holding barrel 303, the lens 301 can be fixed with no eccentricity with respect to the holding barrel 303. This prevents deterioration of the overall optical performance of the lens apparatus 100. The difference (L2−L1) (>0) between the radius L2 and the radius L1 is set to be as small as possible within a range in which the lens 301 can be temporarily assembled to the holding barrel 303 in consideration of manufacturing errors and the like. With respect to the difference (L2−L1), when the lens 301 is temporarily assembled to the holding barrel 303, the lens 301 and the holding barrel 303 can be held in a plane orthogonal to the optical axis with a play instead of press-fitted. For example, L2 may be set to be larger than L1 by, for example, mm.

In the exemplified embodiment, the guide portion 303*f* is formed in a circular arc shape having a radius L2 around the optical axis position, but the present disclosure is not limited to the shape. On the opposite side of the optical axis orthogonal direction receiving portion 303*d* with respect to the first plane, a guide portion 303*f* having a position which is closest to the optical axis and is apart from the optical axis position more than the radius R may be provided.

As a result, since the lens 301 is not in the press-fit state at the stage of temporary holding of the lens 301 to the holding barrel 303 and no stress is applied to the lens 301, the lens surface distortion is not deteriorated.

Further, in the stage where the lens 301 is temporarily held by the holding barrel 303, since the lens 301 is held at a position close to a state in which the assembly of the biasing barrel 302 is completed, the subsequent assembly and fixing are facilitated. When an impact force which has a component in a direction orthogonal to the optical axis and is in a direction opposite to the biasing force of the elastic member 304 is applied to the lens apparatus 100 in a state in which the assembly is completed, the biasing barrel 302 and the lens 301 are displaced with respect to the holding barrel 303. However, since the lens 301 comes into contact with the guide portion 303*f* of the holding barrel 303, the lens 301 is not largely displaced beyond the difference between L2 and L1.

In this way, since the elastic member 304 that biases the lens 301 to the holding barrel 303 via the biasing barrel 302 biases the lens 301 at an angle with respect to the optical axis, the biasing barrel 302 realizes positioning of the lens 301 in the optical axis direction and in a direction in a plane orthogonal to the optical axis.

As to positioning of the lens 301 in the optical axis direction, the lens 301 is biased by the biasing barrel 302 to the optical axis direction receiving portion 303*c* of the holding barrel 303. By accurately forming the surface of the optical axis direction receiving portion 303*c*, the position of the lens 301 in the optical axis direction can be accurately positioned, and face tilting of the lens can be prevented. The biasing force in the optical axis direction by the elastic member 304 is set to about twice to ten times the mass of the lens. Specifically, when the lens mass is 10 g, the biasing force in the optical axis direction by the elastic member 304 is set to about 200 mN to 1000 mN. This is smaller than, for example, a stress applied when the lens is fixed to the lens barrel by thermal caulking, whereby the distortion generated on the lens surface can be suppressed to be small, and deterioration of the optical performance can be suppressed.

Positioning of the lens 301 in a direction orthogonal to the optical axis is performed by biasing the lens 301 toward the optical axis orthogonal direction receiving portion 303d of the holding barrel 303 by the biasing barrel 302. Since the distance (radius of circular arc) L1 from the optical axis of the optical axis orthogonal direction receiving portion 303d and the radius R of the lens 301 are set as L1=R, the lens 301 has a reference surface with which a high accuracy in eccentricity relative to the holding barrel 303 can be realized. The biasing force of the elastic member 304 to bias the lens 301 in the direction orthogonal to the optical axis is set to about twice to ten times the mass of the lens. Specifically, when the lens mass is 10 g, the biasing force in the optical axis direction by the elastic member 304 is set to about 200 mN to 1000 mN. This is much smaller than a stress applied to the lens 301 when, for example, the lens 301 is press-fitted and fixed to the holding barrel 303 in the radial direction. Therefore, in the fixing of the lens to the lens barrel according to the present disclosure, the distortion generated on the lens surface can be suppressed to be small, and deterioration of the optical performance can be suppressed.

In this embodiment, a tension coil spring is adopted as the elastic member 304. When a wave washer is used as the elastic member 304, it is difficult to secure a space for arranging sufficiently long in the biasing direction, and it is difficult to reduce the spring constant. Therefore, the biasing force largely changes by a slight change in the position in the biasing direction (the compression length of the wave washer), and it becomes difficult to apply a desired biasing force. As described above, when the desired biasing force is a relatively small biasing force of about 200 mN to 1000 mN, it is further difficult to provide the desired biasing force. Also, in the case of a resin spring or rubber, a spring constant becomes large, and it is difficult to apply a desired biasing force, and there is a concern that the biasing force changes over time when a creep phenomenon is applied.

When a tensile coil spring is used, the spring constant can be set small and it is easy to realize a weak biasing force as designed as long as the spring length can be ensured. Further, the risk of the biasing force changing over time can be reduced. Therefore, in the present embodiment, it is possible to achieve both a desired biasing force and a space-saving arrangement. As for the elastic member 304, not only the tension coil spring but also a leaf spring or the like can be used as long as the above requirements are satisfied.

In order to stably bias and fix the lens 301 with high precision, the resultant force of the biasing force acting on the two elastic member fixing portions 302e engaged with the elastic member 304 needs to act near the center of gravity P of the lens 301. A region V shown in FIG. 4 is within ½ of the distance from the center of gravity P of the lens 301 to the outer shape of the lens 301. That is, the region V is a region surrounded by a midpoint of a line segment from the center of gravity P of the lens 301 to the outer shape of the lens 301. If the resultant force of the biasing force by the elastic member 304 is configured to act in the region V, the lens 301 can be stably and accurately biased and fixed to the holding barrel 303.

On the contrary, when the resultant force of the biasing force acts on the position outside the region V, the resultant force of the biasing force and the reaction force to the biasing force of the optical axis direction receiving portion 303c become unbalanced, and the pressing of the lens becomes insufficient at a phase where the biasing force is weak, and it is probable that the face tilting in the lens may occur. In addition, when the resultant force of the biasing force is applied to a position significantly deviating from the region V, the face tilting in the lens may occur by a moment particularly when an impact force is applied from the outside depending on the relationship with the reaction force with respect to the biasing force from the optical axis direction receiving portion 303c.

In this embodiment, in order to apply a biasing force in the region V of the lens 301, two elastic member fixing portions 302e with which tension coil springs, which are elastic members 304, are engaged are disposed at positions substantially opposed to each other with the vicinity of the center of gravity P of the lens 301 being interposed. Further, as shown in FIG. 3, the two tension coil springs are disposed substantially parallel to each other and inclined by about 45 degrees with respect to a plane orthogonal to the optical axis. With this arrangement, the resultant force of the biasing force is applied in the region V with a small number of springs and a small space. The elastic member 304 is not limited to two tension coil springs, and three or more elastic members may be used as long as the lens 301 can be biased so that the resultant force of the biasing force acts in the region V.

Next, assembly of this unit will be described. First, the lens 301 is placed on the holding barrel 303 in alignment with the optical axis orthogonal direction receiving portion 303d and the guide portion 303f. Since the lens 301 is not press-fitted and fixed in the radial direction, no special tool is required, and the lens 301 can be easily disposed in the optical axis direction receiving portion 303c of the holding barrel 303 without applying stress for press-fitting the lens 301.

Next, the biasing barrel 302 is incorporated in the holding barrel 303. In the biasing barrel 302, bayonet claws 302g engaged with the holding barrel 303 are formed at three positions at intervals of 120 degrees. In the holding barrel 303, bayonet grooves 303g are formed at three positions at intervals of 120 degrees so as to correspond to the bayonet claws 302g. The holding barrel 303 is provided with an incorporating groove for allowing the bayonet claw 302g to pass through at the time of assembling the biasing barrel 302 at a position rotated about 15 degrees around the optical axis from a position where the bayonet groove 303g is formed. When the biasing barrel 302 is assembled to the holding barrel 303, the biasing barrel 302 is inserted into the holding barrel 303 to a predetermined position in the optical axis direction in this phase state, and is rotated by degrees to be assembled to the completed position shown in FIG. 2. This is similar to the configuration and assembly of a general bayonet system.

In this state, hook portions of the two tension coil springs, which are the elastic members 304, are hooked on the elastic member fixing portion 302e and the elastic member fixing portion 303e, whereby the tension coil springs are fixed. Thereby, the biasing barrel 302 also determines the position of the relative rotational phase around the optical axis of the holding barrel 303.

As described above, the lens 301 can be easily fixed to the holding barrel 303 with high accuracy and ease without using a special tool used in thermal caulking of the lens for assembly.

Next, the behavior when an impact is applied to the lens apparatus will be described.

As shown in FIG. 4, in a state in which the lens 301 is assembled to the holding barrel 303 by the biasing barrel 302 and the elastic member 304, an optical axis orthogonal direction stopper portion 302b and an optical axis orthogonal direction stopper portion 303b are configured to have a gap d2 in a direction orthogonal to the optical axis. It is desirable that the gap d2 be as small as possible within a range in which the gap d2 is not zero even when the manufacturing variation of the parts is taken into consideration.

An optical axis direction stopper portion 303a and an optical axis direction stopper portion 302a are configured to have a gap d1 in the optical axis direction between the bayonet groove 303g provided in the holding barrel 303 and the bayonet claw 302g provided in the biasing barrel 302. It is desirable that the gap d1 be as small as possible within a range in which the gap d1 is not zero even when the manufacturing variation of the parts is taken into consideration.

With the above-described bayonet mechanism, in a state in which the lens 301 is held, there exists a play between relative positions of the biasing barrel 302 and the holding barrel 303 in the optical axis direction and the orthogonal direction, and a movement amount limiting portion that limits a relative movement amount is configured.

When a force equal to or greater than the biasing force is applied in an opposite direction opposite to the biasing force of the elastic member 304 of the biasing barrel 302 due to an impact caused by a drop or the like being applied to the lens apparatus 100, the biasing barrel 302 moves in the opposite direction to the biasing force. This also causes the lens 301 to move. However, in the direction orthogonal to the optical axis, the optical axis orthogonal direction stopper portion 302b and the optical axis orthogonal direction stopper portion 303b serve as stoppers that define a movement limit, and a relative displacement amount between the biasing barrel 302 and the lens 301 does not exceed d2. When the impact force disappears, the original positioning position is recovered again by the biasing force of the elastic member 304.

In the optical axis direction, the optical axis direction stopper portion 303a of the holding barrel 303 and the optical axis direction stopper portion 302a of the biasing barrel 302 serve as stoppers that define the movement limit, and the relative displacement amounts between the biasing barrel 302 and the lens 301 do not exceed d1. When the impact force disappears, the original positioning position is recovered again by the biasing force of the elastic member 304.

At this time, when the gap d2 in the direction orthogonal to the optical axis and the gap d1 in the optical axis direction are large, the relative movable amount of the biasing barrel 302 and the lens 301 becomes large, but in the present embodiment, the movable amount is small because the gap d2 and the gap d1 are set to be small. As a result, it is possible to reduce the risk that the lens tilts to cause a forceful press-fitting when the movable amount is large, and that the lens stops without reaching the positioning position due to friction when the movable amount is small or when a press-fit fixing is generated. That is, even when an impact is applied to the lens apparatus 100, the relative positional relationship between the lens 301 and the holding barrel 303 remains unchanged, and it is easy to return to the original relative positional relationship. In other words, a lens with less change in optical performance can be realized even when an impact is applied.

As described above, when the configuration of this embodiment is applied, a distortion of the lens surface can be reduced and the lens can be positioned with high accuracy, so that it is possible to realize a lens apparatus that prevents deterioration of optical performance due to assembly of the lens to the lens apparatus. In particular, in order to reduce the overall length and weight of the entire lens, it is desirable to make the thickness of the center of the lens and the thickness of the peripheral portion as thin as possible. However, if the thickness of the lens is reduced, the rigidity of the lens decreases which leads to an easy occurrence of a distortion of the lens surface. Even in such a case, by using the present disclosure, the distortion of the lens surface can be suppressed to be small, and a lens with high performance can be realized.

Also, even when the distortion of the lens surface occurs, and when a similar distortion of the lens surface occurs on the object side surface and the image side surface (back surface) of the lens, adverse effects in optical performance may be canceled. On the other hand, in a case where a mirror lens (reflective optical element) used in a telescope or the like is used, since there is no cancellation relationship as described above, surface distortion of the mirror lens directly leads to the deterioration of the optical performance. In the present disclosure, since the lens surface distortion itself can be suppressed to a small value without relying on the cancellation relationship, it is effective for the holding configuration of the mirror lens.

In this embodiment, a case the disclosed technology is applied to the fifth lens unit is exemplified, but the present disclosure is not limited thereto, and can be applied to positioning and fixing of the lens to the lens barrel in other lens units. Further, in the above embodiment, the application to a lens unit which does not move for focusing or zooming is exemplified, but the present disclosure is not limited thereto, and the present disclosure can be similarly applied to a lens unit which moves. In the case where the present disclosure is applied to a moving lens unit, it is preferable to determine the magnitude of the elastic force that biases the lens in consideration of acceleration and direction at the time of the movement.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-120342, filed Jul. 28, 2022, which is hereby incorporated by reference herein in its entirety.

What is claimed is:

1. An optical apparatus comprising:
an optical element;
a holding barrel that holds the optical element;
a biasing barrel that holds the optical element between the holding barrel and the biasing barrel; and
an elastic member that biases the biasing barrel toward the holding barrel,
wherein the holding barrel includes an optical axis direction receiving portion for positioning the optical element in an optical axis direction, and an orthogonal direction receiving portion for positioning the optical element in an orthogonal direction to an optical axis,
wherein the elastic member biases the biasing barrel to cause the optical element being pressed against the optical axis direction receiving portion and the orthogonal direction receiving portion, and being held with respect to the holding barrel in the optical axis direction and the orthogonal direction, and
wherein the optical apparatus comprises a movement amount limiting portion that limits a relative movement amount between the biasing barrel and the holding barrel in the optical axis direction and the orthogonal direction.

2. The optical apparatus according to claim 1, wherein in a state where the optical element is in contact with the optical axis direction receiving portion and the orthogonal direction receiving portion, the holding barrel includes a guide portion configured such that the optical element has a play in a plane orthogonal to the optical axis.

3. The optical apparatus according to claim 2, wherein the orthogonal direction receiving portion has a circular arc shape having a radius corresponding to a radius of the optical element,
   wherein the guide portion has a circular arc shape which has a center at a position of the optical axis of the optical element in a state where the optical element is in contact with the optical axis direction receiving portion and the orthogonal direction receiving portion,
   wherein a radius of the circular arc shape of the guide member is larger than the radius of the optical element.

4. The optical apparatus according to claim 1, wherein the movement amount limiting portion is a bayonet mechanism configured between the holding barrel and the biasing barrel.

5. The optical apparatus according to claim 1, wherein the elastic member comprises at least two coil springs.

6. The optical apparatus according to claim 5, wherein a resultant force of a biasing force exerted on the optical element by the at least two coil springs acts on a region within half a distance from a center of gravity of the optical element to an outer shape of the optical element.

7. The optical apparatus according to claim 1,
   wherein the elastic member comprises two coil springs,
   wherein the two coil springs are disposed at positions opposed to each other with a center of gravity of the optical element being interposed therebetween,
   wherein one end of each of the two coil springs is engaged with the holding barrel, and the other end of each of the two coil springs is engaged with the biasing barrel, and
   wherein each of the two coil springs is disposed obliquely with respect to a plane orthogonal to the optical axis.

8. The optical apparatus according to claim 7, wherein each of the two coil springs is arranged so as to have an angle of not smaller than 30 degrees and not greater than 60 degrees with respect to a plane orthogonal to the optical axis.

9. The optical apparatus according to claim 7, wherein each of the two coil springs is arranged so as to have an angle of 40 degrees or larger and 50 degrees or smaller with respect to a plane orthogonal to the optical axis.

10. The optical apparatus according to claim 7, wherein the two coil springs are arranged parallel to each other.

11. The optical apparatus according to claim 1, wherein the optical element comprises a lens.

12. The optical apparatus according to claim 1, wherein the optical element comprises a mirror.

13. An image pickup apparatus comprising: an optical apparatus, and an image pickup element for picking up an image formed by the optical apparatus,
   wherein the optical apparatus comprising:
   an optical element;
   a holding barrel that holds the optical element;
   a biasing barrel that holds the optical element between the holding barrel and the biasing barrel; and
   an elastic member that biases the biasing barrel toward the holding barrel,
   wherein the holding barrel includes an optical axis direction receiving portion for positioning the optical element in an optical axis direction, and an orthogonal direction receiving portion for positioning the optical element in an orthogonal direction to an optical axis,
   wherein the elastic member biases the biasing barrel to cause the optical element being pressed against the optical axis direction receiving portion and the orthogonal direction receiving portion, and being held with respect to the holding barrel in the optical axis direction and the orthogonal direction, and
   wherein the optical apparatus comprises a movement amount limiting portion that limits a relative movement amount between the biasing barrel and the holding barrel in the optical axis direction and the orthogonal direction.

* * * * *